Patented Aug. 17, 1937

2,090,476

UNITED STATES PATENT OFFICE 2,090,476

PIGMENT AND METHODS OF PREPARING THE SAME

Peter Fireman, Lambertville, N. J., assignor to Magnetic Pigment Company, New York, N. Y., a corporation of New York No Drawing. Application March 14, 1936, Serial No. 68,882

10 Claims. (Cl. 134—59)

This invention relates to methods of preparing pigments and to pigments having useful characteristics adapted for a variety of uses as coloring agents in paints, printing inks and numerous other compositions, the appearance of which may be improved by the addition or inclusion of color.

The invention relates more particularly to pigments of the class which may be designated "ferric monohydrate colors" and represented by the formula $Fe_2O_3.H_2O$. The patent to Penniman and Zoph No. 1,327,061 describes a method of producing pigments by heating a solution of an iron salt such as ferrous sulphate and introducing air thereto in the presence of metallic iron. The operation as continuously conducted brings about the solution of metallic iron in a medium in which both oxidation and reduction are going on, with the result that the pigment material is formed. An improvement in this method is described in the Penniman and Zoph Patent No. 1,368,748. The improvement involves the initial step of preparing an iron compound referred to in the patent as "colloidal ferric hydrate" by the addition of lime or other suitable agent to a solution of an iron salt. The colloidal compound is transferred to a receptacle containing the iron sulphate solution and including iron scrap. In this receptacle the solution is heated while air is introduced as in the method of the earlier Penniman and Zoph patent. A pigment is produced which may vary in color from light to deep yellow, depending upon the time during which the operation is conducted. The pigment has striking characteristics with respect to color strength, and specific gravity, and is widely used in the arts for general pigment purposes.

One of the objects of the present invention is to effect further improvements in the production of "ferric monohydrate colors" and particularly to produce pigments having a wider variation of color which may be used for many purposes for which pigments of the Penniman and Zoph type have not been available heretofore, as well as for purposes to which the older type of pigments were adaptable.

Another object of the invention is the provision of simple and effective methods of preparing pigments of various colors, having qualities which make them suitable for a wide variety of purposes.

I have discovered that new pigments of high quality are obtainable by introducing initially to a medium, which is to be subjected to the action of an oxidizing agent in the presence of metallic iron, a colloidal compound other than "ferric hydrate", a colloidal compound of the class of hydrous oxides and hydroxides. These colloidal compounds are gelatinous substances called gels. They are obtained, with very few exceptions, from the salts of the heavy metals by precipitating their aqueous solutions with an alkali or alkaline carbonate or alkaline earth, or any metallic oxide or hydroxide soluble in water (e. g., zinc oxide). Of colloidal substances otherwise prepared need only be mentioned silica gel, which is obtained by the reaction between a solution of silicate of soda and hydrochloric acid.

The gels precipitated from water solutions of salts of aluminum, chromium, nickel, zinc and titanium, when added to the medium which is thereafter subjected to the action of an oxidizing agent in the presence of metallic iron, cause the production of pigments of various qualities and characteristics, depending upon the material employed and the time during which the reaction is continued. Gels prepared by precipitating compounds of other metals may be used similarly to produce other valuable pigments.

The medium which is subjected to the action of an oxidizing agent in the presence of metallic iron may be an iron salt such as the sulphate or chloride, or other water soluble iron salt. Ferrous sulphate (copperas) is preferred because it is inexpensive and easily obtainable. The solution need not, however, be an iron salt. The course of the reaction whereby the iron is dissolved depends upon hydrolysis, which in the case of sulphates or chlorides of iron releases sulphuric and hydrochloric acid respectively. Other metallic salts which are similarly hydrolyzed to release acids may be used, therefore, as a medium to which the gel is added and which is afterward subjected to the action of an oxidizing agent in the presence of metallic iron to produce the desired pigment. The pigment thus produced is a ferric monohydrate and is precipitated continuously during the operation and modified in color and characteristics by the continued operation as hereinafter described.

The principal operation, in the presence of metallic iron, may be conducted in any suitable apparatus (the "cooking tub"), provided with the necessary means for introducing air and applying heat, as for example steam coils or means for introducing steam to the solution, as shown for example in the Penniman and Zoph Patent No. 1,327,061. The metallic iron, as in that patent, may be contained in a suitable compartment, so that it is readily kept in contact with the heated solution. Preferably, though not necessarily, the initial operation of precipitating the gel is conducted in any suitable and separate receptacle (the "starting tub").

The general procedure, as hereinbefore indicated, consists in first precipitating the gel in a so-called "starting tub". To the gel, a solution, preferably of an iron salt such as ferrous sulphate, is added. The gel and solution are thoroughly stirred up by a current of air and then transferred to the "cooking tub", whose iron compartment is filled with iron scrap. Now all is ready for the pigment production to begin: air and steam are introduced and the temperature brought up to about 130° F. Under these conditions, the iron dissolves, oxidation proceeds apace, and pigment constantly forms.

Several examples of the practice of the method are hereinafter set forth. These, however, are merely illustrative of preferred embodiments of the invention, it being understood that numerous modifications may be made in details such as the bulk of the solution, the temperature and specific gravity thereof, and likewise in the particular compounds which are utilized in conducting the various steps.

In one embodiment of the invention, alumina monohydrate gel is produced by adding a precipitating agent such as sodium carbonate to a solution of an aluminum salt while the solution is stirred with a current of air. A voluminous gelatinous white precipitate of hydrous aluminum monohydrate ($Al_2O_3 \cdot H_2O$) is formed. The solution and precipitate may be of a bulk sufficient to fill about five feet of a tub twenty feet deep. After the precipitate is formed, sufficient solution of an iron salt such as ferrous sulphate is introduced to fill about ten feet of the tub. This solution should have a specific gravity of approximately 1.045. The mixture is stirred with air for some hours and is transferred to a "cooking tub" having a compartment for metallic iron. Additional solution may be added to ensure contact of the solution with the metallic iron. A lively current of air is introduced for oxidation and agitation and steam is supplied either directly or indirectly to maintain a temperature of about 130° F. which is preferably maintained substantially constant. The temperature is not, however, critical. The operation is continued for a number of days, the metallic iron being replaced from time to time as it is consumed.

As a result of the operation, the white precipitate soon darkens and becomes almost black after twenty-four hours. On the third day, the blackness disappears and the precipitate in the tub turns to dark reddish brown. On the following days, the color changes to lighter shades, generally to greenish-yellow-brown. After about a week, the color is a rich brown and deepens from day to day. If precipitation of the colloidal aluminum base is carried out at a boiling temperature, the shades of color at all stages tend to be lighter and more greenish. The pigment in either case is of very fine texture, absorbs medium amounts of oil, and grinds very easily.

The colors prepared as above may be designated artificially prepared raw siennas. They give bright reds on calcination, with the shades running from light to deep, depending upon the length of time during which the raw pigment was in course of production.

In preparing the hydrous alumina monohydrate gel, any water soluble aluminum salt and alkaline materials such as the hydroxides and carbonates of the alkali and alkaline earth metals may be used. Variations of temperature, of concentration and of relative proportions of ingredients are permissible within fairly wide limits.

Satisfactory pigments may be provided likewise by precipitating a gel from a solution of a chromic salt by the addition of an alkaline agent as previously described. Gelatinous gray-green hydrous chromic oxide is formed. To this a solution of an iron salt such as ferrous sulphate of specific gravity 1.045 is added as in the preceding embodiment of the invention. After a few hours of agitation with air, the precipitate and solution are transferred to the "cooking tub" provided with compartment containing metallic iron. Air and steam are supplied while the temperature is maintained at about 130° F., although it need not be precisely held at that point. The original green color disappears entirely on the third day, the mass becoming dark brown. During the following three or four days, the color gradually lightens to a beautiful red-brown. At the end of this period, the operation may be discontinued if a reddish-brown color of medium depth is desired. Cooking for a few days longer makes the shade lighter. When calcined, these pigments range from crimson to purplish-brown.

Similar results are secured by adding an alkali such as sodium hydroxide to a solution of a nickelous salt. A voluminous apple-green precipitate of a gelatinous character is formed. A solution of ferrous sulphate of specific gravity 1.045 may be added as in the preceding embodiments of the invention, after which the solution is agitated for some hours with air and then transferred to the cooking tub where air and steam are supplied while the solution is in contact with metallic iron. The green color of the precipitate soon changes to reddish-brown. On the following day, the mass in the cooking tub turns bright reddish-brown, and thereafter the color gradually lightens to a chocolate-brown tone. Finished at an early stage, the pigment is a unique neutral brown. At later stages, the color is lighter and more greenish. Upon calcining, red pigments are obtained.

Another practical application of the invention involves precipitation of a gelatinous white precipitate by the addition of an alkaline agent such as sodium hydroxide to a solution of zinc sulphate. A solution of ferrous sulphate, for example of specific gravity 1.045, is added, and the solution is agitated with air for some hours while the white color gives place to light blue, green and brown. The solution and precipitate are then transferred to the cooking tub in contact with metallic iron and agitated while a suitable temperature is maintained by means of steam. As the operation progresses, the color changes to orange-brown of varying depth. The gradation of colors in this case is from dark to light and then to deep. The characteristic of this pigment is great strength of color and rather high oil absorption. Upon calcining, a red pigment of great beauty and strength is obtained.

Another modification involves the use of a titanium compound. The preferred compound is a commercial product known as "titanium cake". It is titanium disulphate ($Ti(SO_4)_2$). This compound can be dissolved in cold water by vigorous stirring. It is precipitated by the addition of an alkaline agent such as sodium hydroxide to produce a white gel. Upon the addition of ferrous sulphate and the introduction of air, the precipitate becomes pinkish-white. When this precipitate and solution are transferred to the cooking tub and subjected to air and heat in the presence of metallic iron, the color first lightens to yellowish-white, then turns to pinkish-orange-brown, and finally to fiery reddish-tan when the operation, having been conducted for three or four days, may be discontinued. More prolonged operation lightens the shade of the pigment somewhat. Upon calcining, the pigment is light red with an undertone of a light salmon shade.

It is to be understood that in producing the gels described not only sulphates or chlorides, but any soluble salt of the respective metals may be used, and that any alkaline material such as the hydroxides and carbonates of the alkali and alkaline earth metals or other oxides or hydroxides soluble in water may be used as precipitating agents. The precipitation can be conducted either hot or cold. The reacting materials may be supplied in equivalent quantities, but excesses of either do not seriously affect the reaction. The concentrations of the solutions may be varied widely. The invention is not limited to the use of gels of the hydrous oxides or hydroxides of aluminum, chromium, nickel, zinc, or titanium, which are described herein merely as examples. The gels of hydrous oxides or hydroxides of other metals may be employed similarly.

It is to be understood also as hereinbefore indicated, that while an iron salt and particularly ferrous sulphate is desirable as the medium in which the metallic iron is dissolved, it is not essential to employ an iron salt for this purpose. Any salt which is hydrolyzed under the conditions of the reaction to release an acid which in turn attacks and dissolves the iron may be utilized for the purpose, as for example the chloride or sulphate of aluminum. I may, therefore, use as the medium in which the reaction is conducted any suitable hydrolyzable salt.

Although air is the most convenient oxidizing agent for use in the procedure described, because it is readily available and facilitates the regulation of the operation, oxygen or mixtures containing oxygen or other oxidizing agents may be used. The function of the oxygen in the air is to oxidize the iron as it dissolves. Any agent which accomplishes this function is suitable for the purpose.

The method as described opens an entirely new field of pigments of the type referred to herein as ferric monohydrate colors. Pigments produced by the Penniman and Zoph method have relatively wide uses, but are subject to certain limitations with respect to the available colors and shades which can be secured in accordance with the known procedure. As will be evident from the foregoing description, pigments of varied color, quite dissimilar to those produced by the Penniman and Zoph method, are supplied by the practice of the procedure hereinbefore outlined, Various changes may be made in the details of procedure and of the reagents employed therein without departing from the invention or sacrificing any of the advantages thereof.

Wherever in the claims the term "hydrous oxide" is used, it is intended to include hydrous hydroxides.

I claim:

1. The method of preparing pigments, which comprises introducing a gelatinous, non-ferrous, metallic hydrous oxide to a solution of an iron salt, heating the solution to accelerate hydrolysis of the iron salt with resultant formation of ferrous hydroxide, and oxidizing the formed ferrous hydroxide to form an hydrated ferric oxide of iron while the solution of the iron salt is in contact with metallic iron.

2. The method of preparing pigments, which comprises hydrolyzing a solution of an iron salt to form ferrous hydroxide, oxidizing the ferrous hydroxide to ferric oxide monohydrate while the iron salt is in contact with metallic iron, precipitating the formed ferric oxide monohydrate on a gelatinous substance of the class consisting of silica gel and metallic hydrous oxides and hydroxides which have colors different from that of the formed hydrated ferric oxide, whereby pigments having colors different from that of the hydrated ferric oxide are produced.

3. The method of preparing pigments, which comprises hydrolyzing a solution of an iron salt to form ferrous hydroxide, oxidizing the ferrous hydroxide to ferric oxide monohydrate with oxygen while the iron salt is in contact with metallic iron, precipitating the formed ferric oxide monohydrate on a gelatinous substance of the class consisting of silica gel and metallic hydrous oxides and hydroxides which have colors different from that of the formed hydrated ferric oxide, whereby pigments having colors different from that of the hydrated ferric oxide are produced.

4. The method of preparing pigments, which comprises hydrolyzing a solution of an iron salt to form ferrous hydroxide, oxidizing the ferrous hydroxide to ferric oxide monohydrate while the iron salt is in contact with metallic iron, precipitating the formed ferric oxide monohydrate on a gelatinous aluminum hydrous oxide or hydroxide, whereby pigments having colors different from that of the hydrated ferric oxide are produced.

5. The method of preparing pigments, which comprises hydrolyzing a solution of an iron salt to form ferrous hydroxide, oxidizing the ferrous hydroxide to ferric oxide monohydrate while the iron salt is in contact with metallic iron, precipitating the formed ferric oxide monohydrate on a gelatinous chromium hydrous oxide or hydroxide, whereby pigments having colors different from that of the hydrated ferric oxide are produced.

6. The method of preparing pigments, which comprises hydrolyzing a solution of an iron salt to form ferrous hydroxide, oxidizing the ferrous hydroxide to ferric oxide monohydrate while the iron salt is in contact with metallic iron, precipitating the formed ferric oxide monohydrate on a gelatinous zinc hydrous oxide or hydroxide, whereby pigments having colors different from that of the hydrated ferric oxide are produced.

7. A composite pigment consisting of an hydrated ferric oxide precipitated on a nucleus of a gelatinous substance of the class consisting of silica gel and metallic hydrous oxides and hydroxides which have colors different from that of the formed hydrated ferric oxide.

8. A composite pigment consisting of an hydrated ferric oxide precipitated on a nucleus of aluminum hydrous oxide or hydroxide.

9. A composite pigment consisting of an hydrated ferric oxide precipitated on a nucleus of chromium hydrous oxide or hydroxide.

10. A composite pigment consisting of an hydrated ferric oxide precipitated on a nucleus of zinc hydrous oxide or hydroxide.

PETER FIREMAN.